US008004933B2

(12) United States Patent
Iseli

(10) Patent No.: US 8,004,933 B2
(45) Date of Patent: Aug. 23, 2011

(54) SINGLE STATION WIRELESS SEISMIC DATA ACQUISITION METHOD AND APPARATUS

(75) Inventor: James Iseli, Allen, TX (US)

(73) Assignee: INOVA, Ltd., Georgetown, Grand Cayman (KY)

( * ) Notice: Subject to any disclaimer, the term of this patent is extended or adjusted under 35 U.S.C. 154(b) by 72 days.

(21) Appl. No.: 11/940,932

(22) Filed: Nov. 15, 2007

(65) Prior Publication Data
US 2008/0062815 A1 Mar. 13, 2008

Related U.S. Application Data

(63) Continuation of application No. 10/664,566, filed on Sep. 17, 2003, now abandoned.

(51) Int. Cl.
G01V 1/00 (2006.01)
(52) U.S. Cl. .......................................................... 367/76
(58) Field of Classification Search .............. 367/76–80, 367/38; 342/357.74
See application file for complete search history.

(56) References Cited

U.S. PATENT DOCUMENTS

| 3,990,036 | A |   | 11/1976 | Savit |        |
|-----------|---|---|---------|---------------|--------|
| 4,066,993 | A |   | 1/1978  | Savit         |        |
| 4,086,504 | A | * | 4/1978  | Ezell et al.  | 367/77 |
| 4,281,403 | A | * | 7/1981  | Siems et al.  | 367/76 |
| 4,589,100 | A | * | 5/1986  | Savit         | 367/77 |
| 4,725,992 | A | * | 2/1988  | McNatt et al. | 367/77 |
| 4,868,795 | A | * | 9/1989  | McDavid et al.| 367/77 |
| 4,908,803 | A |   | 3/1990  | Rialan        |        |
| 4,967,400 | A |   | 10/1990 | Woods         |        |
| 5,696,903 | A |   | 12/1997 | Mahany        |        |
| 5,706,250 | A |   | 1/1998  | Rialan et al. |        |
| 5,822,273 | A |   | 10/1998 | Bary et al.   |        |
| 5,930,293 | A |   | 7/1999  | Light et al.  |        |

(Continued)

FOREIGN PATENT DOCUMENTS

EP 0250280 A1 12/1987

(Continued)

OTHER PUBLICATIONS

408UL Reference Training Guide, Firmware Network Description, Jan. 13, 2000, pp. 13-1 to 13-18.

(Continued)

Primary Examiner — Mark Hellner
(74) Attorney, Agent, or Firm — Mossman Kumar & Tyler PC

(57) ABSTRACT

A seismic data acquisition apparatus having a recorder co-located with a sensor unit in a seismic spread and a communication device for direct communication with a central recorder. A memory located in the recorder and/or in the central controller holds location parameters associated with the sensor unit, and the parameters can be updated. Methods of seismic data acquisition including sensing seismic energy and recording the sensed energy at the sensor location. Delivering the recorded information to a central recorder by manually retrieving removable memory from each recorder, by wireless transmission of the information, or by removing the information from each recorder by inductive or cable connectors and a transfer device. It is emphasized that this abstract is provided to comply with the rules requiring an abstract which will allow a searcher or other reader to quickly ascertain the subject matter of the technical disclosure. It is submitted with the understanding that it will not be used to interpret or limit the scope or meaning of the claims.

21 Claims, 7 Drawing Sheets

U.S. PATENT DOCUMENTS

| | | | |
|---|---|---|---|
| 6,226,601 B1 | 5/2001 | Longaker | |
| 6,240,094 B1 | 5/2001 | Schneider | |
| 6,332,109 B1 | 12/2001 | Sheard et al. | |

FOREIGN PATENT DOCUMENTS

| | | | |
|---|---|---|---|
| EP | 0552769 | A2 | 7/1993 |
| WO | WO 92/12442 | A1 | 7/1992 |
| WO | WO9812577 | * | 3/1998 |
| WO | WO9818022 | | 4/1998 |
| WO | WO0060424 | | 10/2000 |
| WO | WO0108053 | A2 | 2/2001 |

OTHER PUBLICATIONS

SGR II, Seismic Group Recorder System: High technology with a track record., Global Universal Sciences, Inc., 1984, pp. 1-6.

SGR III, Seismic Group Recorder System, Global Universal Sciences, Inc., 1985, pp. 1-4.

LaCosta & Romberg—Scintrex, Inc. Quarterly, vol. 1, Issue 3, May 12, 2003, What's Happening at LRS?, pp. 1-4.

* cited by examiner

SINGLE STATION WIRELESS SEISMIC DATA ACQUISITION METHOD AND APPARATUS

CROSS-REFERENCE TO RELATED APPLICATIONS

This is a continuation application of pending U.S. application Ser. No. 10/664,566 filed on Sep. 17, 2003, which is hereby incorporated herein by reference and which is a continuation-in-part of U.S. application Ser. No. 09/361,020, now U.S. Pat. No. 7,218,890 issued May 15, 2007, which claims benefit of U.S. Provisional Application No. 60/095,696 filed Aug. 7, 1998 and U.S. Provisional Application No. 60/095,792 filed Aug. 7, 1998 which are hereby incorporated herein by reference.

BACKGROUND OF THE INVENTION

Oil companies' conduct seismic surveying to lower risk and to reduce costs of locating and developing new oil and gas reserves. Seismic surveying is, therefore, an up front cost with intangible return value. Consequently minimizing the cost of seismic surveying and getting quality results in minimum time are important aspects of the seismic surveying process.

Seismic surveys are conducted by deploying a large array of seismic sensors over a surface portion of the earth. Typically, these arrays cover 50 square miles and may include 2000 to 5000 seismic sensors. An energy source (buried dynamite for example) is discharged within the array and the resulting shock wave is an acoustic wave that propagates through the subsurface structures of the earth. A portion of the wave is reflected at underground discontinuities, such as oil and gas reservoirs. These reflections are then sensed at the surface by the sensor array and recorded. Such sensing and recording are referred to herein as seismic data acquisition, which might also be performed in a passive mode without an active seismic energy source.

A three dimensional map, or seismic image, of the subsurface structures is generated by moving the energy source to different locations while collecting data within the array. This map is then used to make decisions about drilling locations, reservoir size and pay zone depth.

A very important factor in determining the quality and resolution of the seismic image is the density of sensors in the array. Those skilled in the art recognize that greater sensor density, i.e., number of sensors in the array, provides sharper and clearer images.

The density of sensors is usually limited by economic and reliability factors. If the cost can be lowered and reliability increased, higher quality seismic images can be acquired. Better image quality can enable better informed drilling decisions and thus reduce investment risk for the oil company.

The traditional sensor has long been a geophone velocity measuring sensor. Today, accelerometers are becoming more widely utilized, and multi-axis, or multi-component, accelerometers are emerging. Multi-component (three axis) sensing has shown to give superior images of the subsurface as compared to single component sensing. Multi-component sensing, however, has not been economically viable in the past due to the added cost of the recording system and implementation problems with multi-component analog sensors. With the advent of the multi-component digital sensor, such as the Vectorseis® sensor module available from ION Geophysical Corporation, Houston, Tex., a multi-component digital sensor is now practical. Multi-component recording, however, requires higher sensor density than single component recording to realize the full advantage seismic imaging with multi-component recording.

The most popular architecture of current seismic data acquisition systems is a point-to-point cable connection of all of the sensors. Output signals from the sensors are usually digitized and relayed down the cable lines to a high-speed backbone field processing device or field box. The high-speed backbone is typically connected in a point-to-point relay fashion with other field boxes and then to a central recording system where all of the data are recorded onto magnetic tape.

Seismic data may be recorded at the field boxes for later retrieval, and in some cases a leading field box will communicate command and control information with the central recorder over a radio link. Still, there exists miles of cabling between the individual field boxes, between the field boxes and sensor lines, and between the sensors.

The above cable system architecture results in more than 100 miles of cable deployed over the survey area. The deployment of miles of cable over varying terrain requires significant equipment and labor, often in environmentally sensitive areas.

FIG. 1 depicts a typical seismic data acquisition system 100. The typical system 100 includes an array ("string") of spaced-apart seismic sensor units 102. Each string of sensors is typically coupled via cabling to a data acquisition device ("field box") 103, and several data acquisition devices and associated string of sensors are coupled via cabling 110 to form a line 108, which is then coupled via cabling 110 to a line tap or ("crossline unit") 104. Several crossline units and associated lines are usually coupled together and then to a central controller 106 housing a main recorder (not shown). The typical sensor unit 102 in use today is a velocity geophone used to measure acoustic wave velocity traveling in the earth. Recently, and as noted above, acceleration sensors (accelerometers) are finding more widespread acceptance for measuring acceleration associated with the acoustic wave. Each sensor unit might comprise a single sensor element or more than one sensor element for multi-component seismic sensor units.

The sensors 102 are usually spaced at least on the order of tens of meters, e.g., 13.8-220.0 feet. Each of the crossline units 104 typically performs some signal processing and then stores the processed signals as seismic information for later retrieval as explained above. The crossline units 104 are each coupled, either in parallel or in series with one of the units 104a serving as an interface with between the central controller 106 and all crossline units 104.

In a conventional cable system data are relayed from one sensor unit to the next sensor unit and through field boxes hundreds of times before reaching the central recording system. Failure of any one field box or cable causes recording to stop until the fault is repaired due to the potential for losing large amounts of information. Consequently, common cable systems have an average uptime of about only 45%.

The basic architecture and reliability issues of the current cable approach described above prevent seismic data acquisition systems from being scaled to significantly higher channel counts. More recent cable systems incorporate different levels of redundancy to address the issue of single-point failure. These redundant systems include multiple redundant backbones, telemetry reversal and other redundancy features. These solutions, however, require even more cable to be deployed on the ground and still limit fault tolerance to no more than two failures in a line that can be many miles long.

Optimal spacing between seismic sensors varies depending on desired image depth and type. When deploying sensors obstacles are often encountered, such as no permit areas, rivers, and roads that cause the seismic crew to use varying spacing between sensor stations. Varying the distance between sensors in a conventional cable system is not convenient due to the fixed interval between connection points. Usually a surveying crew is used to locate the planned position of sensors on the ground prior to laying out the acquisition equipment. A backpack global positioning system ("GPS") receiver is then is used by the surveyor and stakes are planted in the ground at each of thousands of predetermined sensor locations. Therefore, array deployment in the typical system is a two-step process adding time and labor costs to the seismic survey process.

In view of the typical seismic data acquisition system described above, there is a need for flexible spacing intervals between sensor units that will enable easy sharing of equipment between different crews without the worry of incompatible cables due to station interval requirements or to a particular environmental application (e.g., arctic, transition zone, and desert all require different types of cable).

There is also a need for integrating global positioning system (GPS) technology at the sensor unit to eliminate multiple crew process steps for identifying sensor locations and deploying sensors at the location. The typical system suffers, because the sensor unit is not co-located at the data acquisition device, thus the true sensor location is not available to the system for survey analysis.

SUMMARY OF THE INVENTION

The present invention addresses some or all of the problems associated with the conventional cable systems described above and provides a single station radio architecture with independent location of individual wireless sensor stations. This allows both geophysicists and seismic crews to apply the system most efficiently without constraints of fixed station intervals.

One aspect of the present invention is an apparatus comprising a sensor unit coupled to the earth for sensing seismic energy in the earth. The sensor unit provides a signal indicative of the sensed seismic energy to an acquisition device co-located with the sensor unit and coupled thereto for receiving the signal. A memory unit is disposed in the acquisition device for storing information indicative of the received signal, and a communication device is co-located with the sensor unit and the acquisition device for providing direct communication with a remotely-located control unit. One or more location parameters are stored in either the central controller and/or the memory unit. The sensor unit might include a multi-axis accelerometer or a velocity sensor such as a geophone. The memory unit is removable in one aspect and might be a memory card or removable hard drive.

In another aspect of the invention, a method for acquiring seismic information comprises sensing seismic energy in the earth using a sensor unit coupled to the earth and sending a signal indicative of the sensed seismic energy from the sensor unit to an acquisition device co-located with the sensor unit. Then information indicative of the signal is stored in a memory unit disposed in the acquisition device. The method also includes directly communicating with a remotely-located control unit using a communication device co-located with the sensor unit and the acquisition device. One or more location parameters are stored in either the central controller and/or the memory unit.

Another aspect of the present invention is an apparatus for detecting unwanted movement of a remotely-located seismic data acquisition device. The apparatus comprises a sensor disposed in the seismic data acquisition device for detecting movement and to provide a first signal indicative of the movement. A processor is coupled to the sensor for processing the first signal, and the processor provides a second signal indicative of unwanted movement associated with the data acquisition device. A communication device located with the sensor and the acquisition device transmits the second signal to a central controller.

A method according to one embodiment of the invention is used for detecting unwanted movement of a remotely-located seismic data acquisition device. The method includes detecting movement using a sensor disposed in the seismic data acquisition device, the sensor providing a first signal indicative of the movement and processing the first signal using a processor coupled to the sensor. The processor provides a second signal indicative of unwanted movement associated with the data acquisition device and transmitting the second signal to a remotely-located central controller using a communication device co-located with the sensor and the acquisition device.

Another aspect of the invention is a system for seismic surveying, comprising a central control unit with a sensor unit remotely located from the central control unit, the sensor unit coupled to the earth for sensing seismic energy in the earth and for providing a signal indicative of the sensed seismic energy. A recorder device is co-located with the sensor unit and is coupled thereto for receiving the signal and for storing information indicative of the received signal in a memory disposed in the recorder device. A communication device is co-located with the sensor unit and the acquisition device for providing direct communication with the central control unit. One or more location parameters are stored in either the central controller and/or the recorder device. The system might operate in a passive mode or in an active mode using a seismic energy source.

Another aspect of the invention is a method for deploying a sensor unit comprising transporting the sensor unit to a location, deploying the sensor unit, determining location parameters for the sensor unit, and updating system parameters based at least in part on the determined location parameters.

Another aspect of the present invention is a system for seismic surveying, comprising a central controller, a plurality of sensors disposed to form a seismic spread having a plurality of sensing locations, and a plurality of recorders, each of the plurality of recorders recording seismic information corresponding to a selected sensing location from the plurality of sensing locations, each of the plurality of recorders being in direct communication with the central controller.

Another aspect of the present invention is an apparatus for seismic surveying, comprising a plurality of sensors disposed to form a seismic spread having a plurality of sensing locations, and a plurality of recorders, each of the plurality of recorders recording seismic information corresponding to a selected sensing location from the plurality of sensing locations.

Another aspect of the present invention is an apparatus comprising a sensor unit coupled to the earth for sensing seismic energy in the earth. The sensor unit provides a signal indicative of the sensed seismic energy to an acquisition device co-located with the sensor unit and coupled thereto for receiving the signal. A memory unit is disposed in the acquisition device for storing information indicative of the received signal, and a direct-conversion radio transceiver for providing communication between the acquisition device and a remotely-located central controller.

BRIEF DESCRIPTION OF THE DRAWINGS

The novel features of this invention, as well as the invention itself, will be best understood from the attached drawings, taken along with the following description, in which similar reference characters refer to similar parts, and in which.

DETAILED DESCRIPTION OF THE INVENTION

Figure 2:
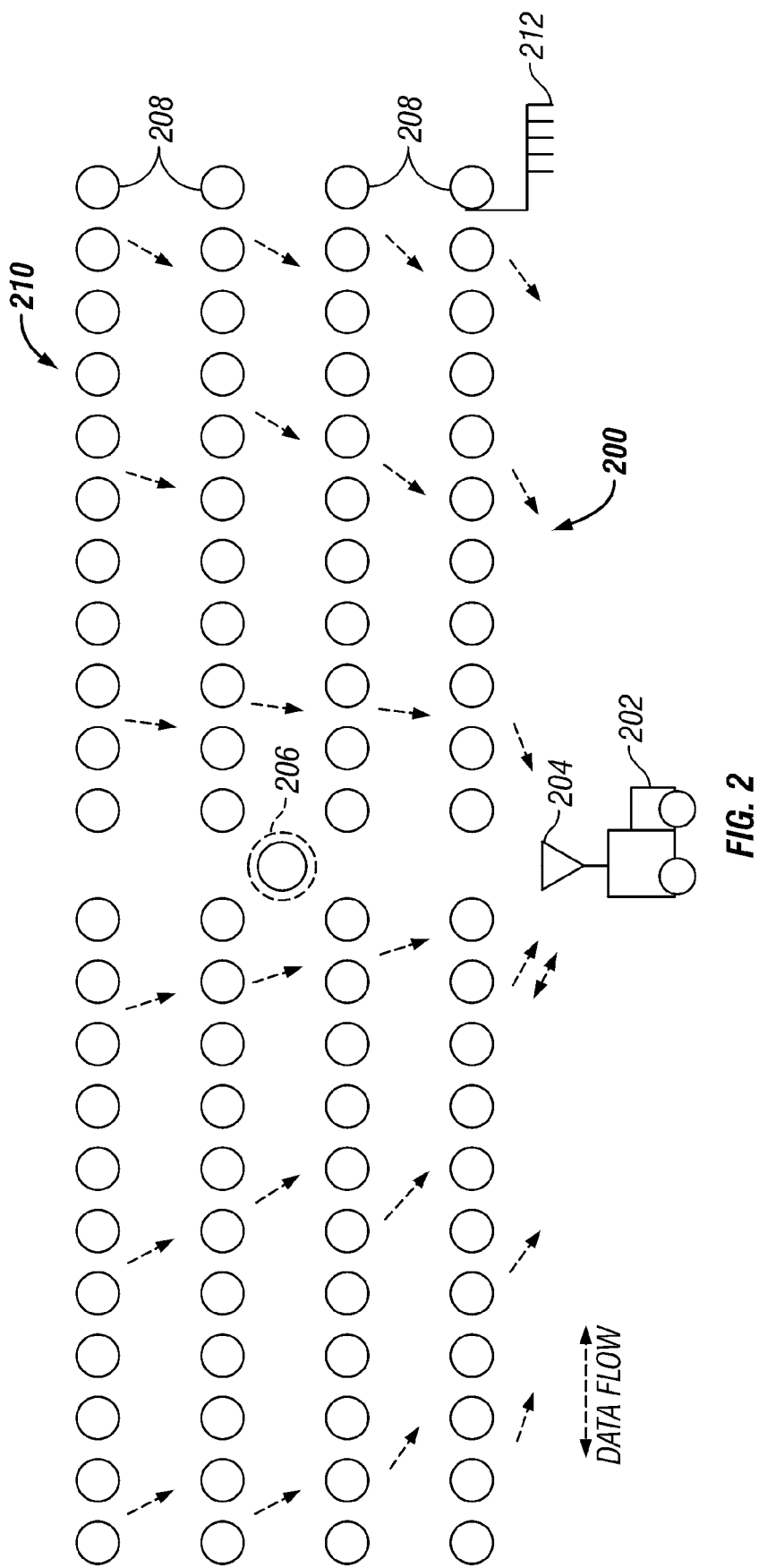
FIG. 2 is a conceptual representation of a system according to the present invention.

FIG. 2 is a conceptual representation of a system according to the present invention. The system 200 includes a central controller 202 in direct communication with each of a number of wireless sensor stations 208 forming an array ("spread") 210 for seismic data acquisition. Each sensor station 208 includes one or more sensors 212 for sensing seismic energy. Direct communication as used herein refers to individualized data flow as depicted in FIG. 2 by dashed arrows. The data flow can be bi-directional for allowing command and control instructions to be sent from the central controller 202 to each wireless sensor station 208 and for quality control and/or selected pre-processed seismic information to flow from each wireless sensor station 208 to the central controller 202. The communication might be in the form of radio signals transmitted and received at the central controller 202 via a suitable antenna 204. The system 200 may operate in a passive mode by sensing natural or random seismic energy traveling in the earth. The system 200 may also operate in an active mode using a seismic energy source 206 to provide seismic energy of a known magnitude and source location.

Figure 1:
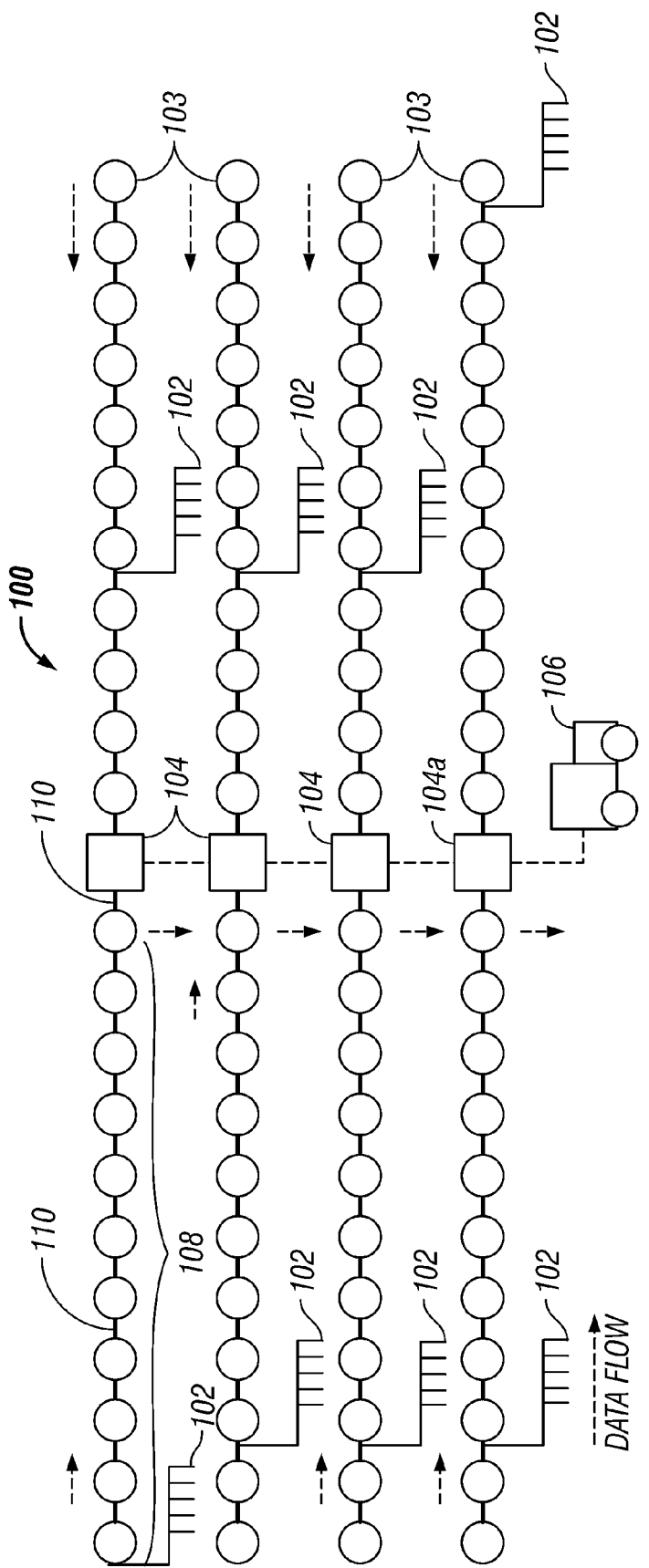
FIG. 1 represents a typical seismic data acquisition system.

Certain advantages are apparent from the conceptual representation shown in FIG. 2. Among other things, the use of individual wireless sensor stations 208 to form the spread 210 eliminates interconnecting cables, such as the cables 110 associated with the typical line described above and shown in FIG. 1. Elimination of these cables provides the survey crew the option of moving individual sensors without affecting placement of other sensors in the spread. Another advantage is the reduction of weight in the overall spread. The typical spread requires miles of interconnecting cables that might weigh as much as 55,000 pounds or more. This extreme weight slows the crew and adds cost to deployment in terms of fuel, time and materials.

Another advantage is in the elimination of single-point failures that can cause information loss from at least an entire line of sensors. A failed cable or cable connector, a failed field box, or a failed crossline unit in the typical system of FIG. 1 will cause such a loss of information. The single station radio architecture of the present invention provides independent communication paths between the acquisition units and the central recording system. The failure of a single radio acquisition unit causes data to be lost from only one station and recording can continue while it is repaired without loss of information from other sensor stations.

Figure 3A:
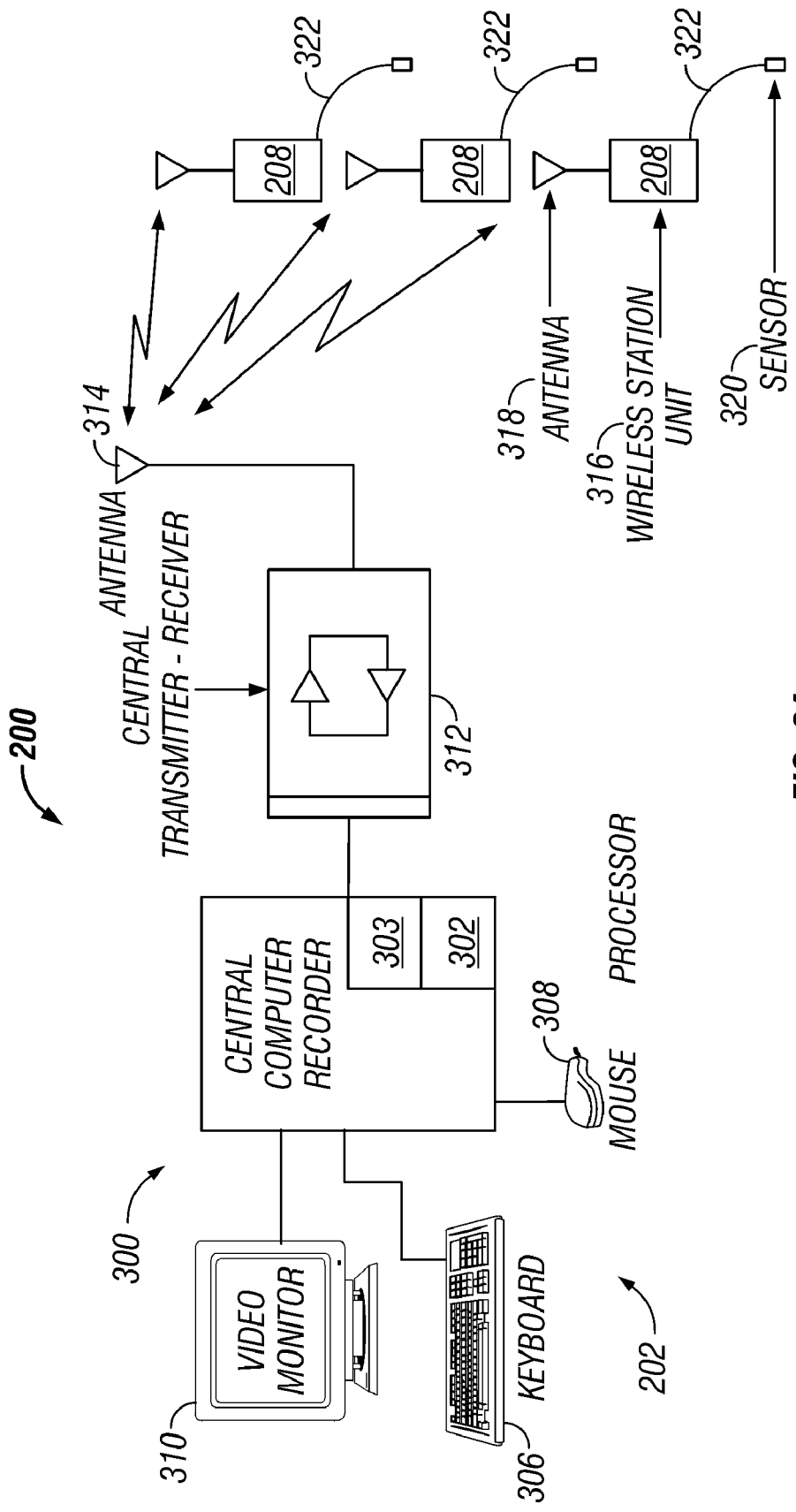
FIG. 3A shows a schematic representation of the system of FIG. 2 in more detail.

FIG. 3A is a schematic representation of the system 200 in more detail. The central controller 202 includes a computer 300 having a processor 302 and a memory 303. An operator can interface with the system 200 using a keyboard 306 and mouse or other input 308 and an output device such as a monitor 310. Communication between remotely-located system components in the spread 210 and the central controller 202 is accomplished using a central transmitter-receiver ("transceiver") unit 312 disposed in the central controller 202 along with an antenna 314.

Figure 3B:
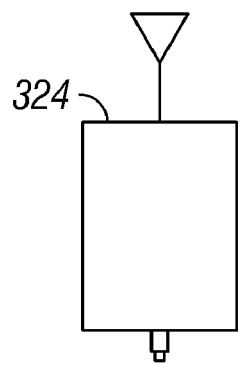
FIG. 3B shows one embodiment of a wireless station unit having an integrated seismic sensor.

The central controller 202 communicates with each wireless sensor station 208. Each wireless sensor station 208 shown includes a wireless station unit 316, an antenna 318 compatible with the antenna 314 used with the central controller 202, and a sensor unit 320 responsive to acoustic energy traveling in the earth co-located with a corresponding wireless sensor station. Co-located, as used herein, means disposed at a common location with one component being within a few feet of the other. Therefore, each sensor unit 320 can be coupled to a corresponding wireless station unit by a relatively short cable 322, e.g., about 1 meter in length, or coupled by integrating a sensor unit 320 with the wireless station unit 316 in a common housing 324 as shown in FIG. 3B.

Figure 3C:
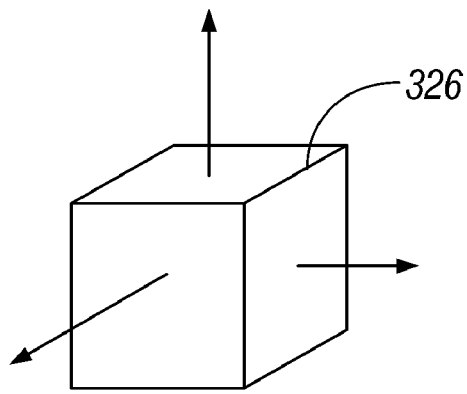
FIG. 3C illustrates a multi-component sensor for use in one embodiment of the present invention.

One sensor for use in a sensor unit 320 might be a multi-component sensor 326 as shown in FIG. 3C. The multi-component sensor shown includes a three-component accelerometer sensor incorporating micro electro-mechanical systems (MEMS) technology and application-specific integrated circuits (ASIC) as found in the Vectorseis® sensor module available from ION Geophysical Corporation, Houston, Tex. The present invention, however, does not exclude the option of using velocity sensors such as a conventional geophone or using a pressure sensor such as a conventional hydrophone. Any sensor unit capable of sensing seismic energy will provide one or more advantages of the present invention. Furthermore, the present invention is useful using a single sensor unit 320 as shown, or the sensor unit 320 might include multiple sensors connected in a string.

Figure 3D:
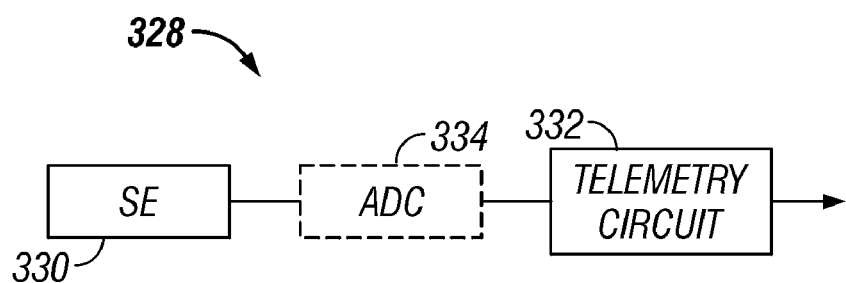
FIG. 3D is a schematic representation of a sensor unit according to the present invention with an optional analog-to-digital converter.

FIG. 3D is a schematic representation of a one component 328 in one embodiment of a sensor unit 320. Those skilled in the art would recognize that a three component sensor to measure seismic energy in multiple axes is realizable by providing additional components substantially similar to the one shown. Therefore, further illustration is not necessary. The sensor component 328 shown includes a sensing element 330 for sensing the seismic energy traveling in the earth. The sensing element detects motion caused by the seismic energy and provides an analog output signal indicative of the motion. The sensor component includes a transmitter/receiver circuit 332 to receive the sensing element output signal and to transmit the output signal to the wireless station unit for further processing, storage and/or for wireless transmission to the central controller. As shown FIG. 3D by the dashed lines, an optional analog-to-digital converter ("ADC") 334 might be incorporated into the sensor unit 320 for providing a digital signal from the sensor unit 320. When the sensor unit 320 provides an analog output signal, the wireless station unit 316 might include an ADC for converting the received analog output signal to digital form.

Figure 4:
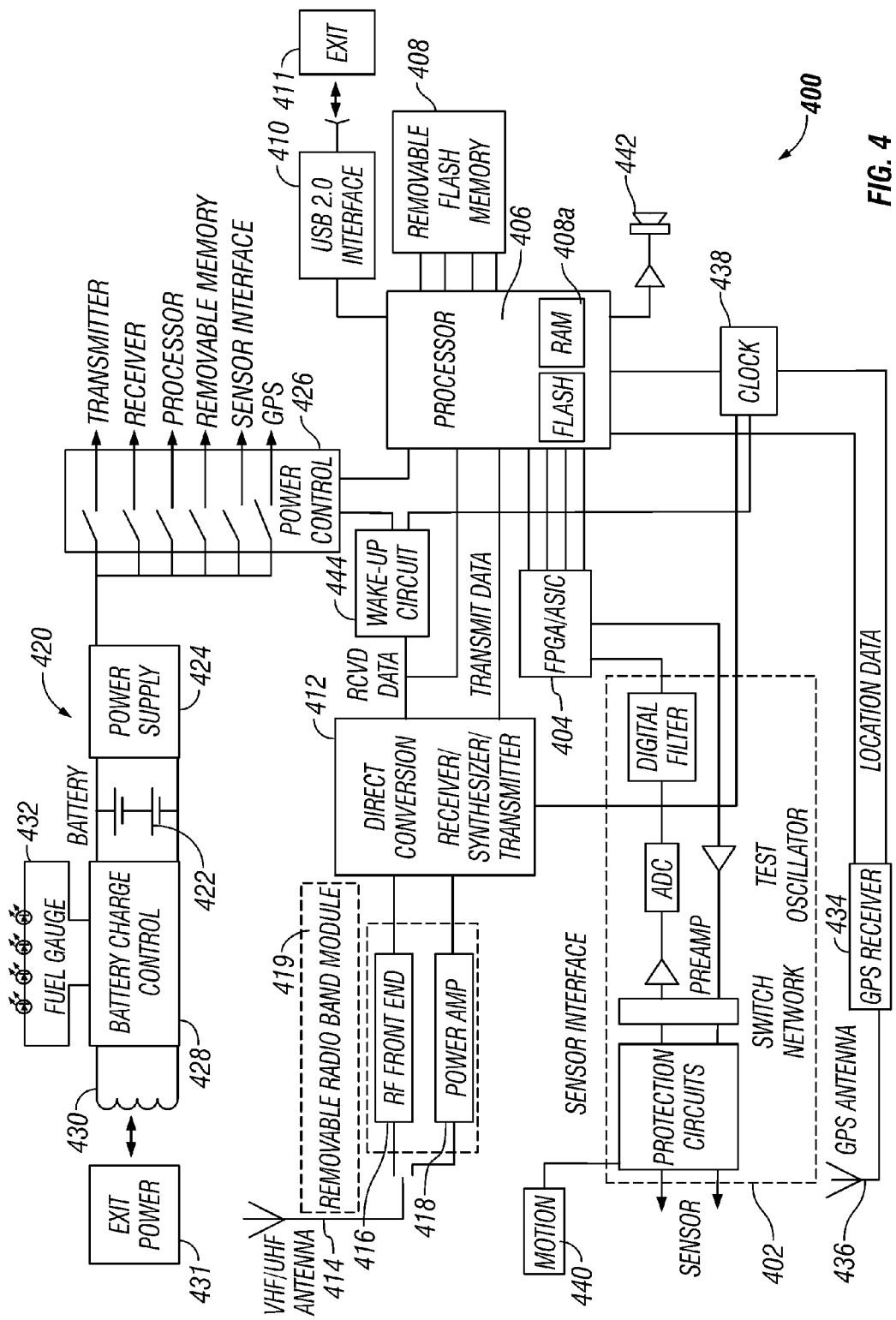
FIG. 4 is a schematic representation of a wireless station unit according to the present invention incorporating circuitry to interface with an analog output sensor unit.

FIG. 4 is a schematic representation of a wireless station unit 400 according to the present invention that operates as a data recorder incorporating circuitry to interface with an analog output sensor unit (not shown). The wireless station unit 400 is an acquisition device that includes a sensor interface 402 to receive an output signal from the sensor unit. The sensor interface 402 shown includes a protection circuit, switch network, a preamplifier, a test oscillator, and ADC and digital filtering circuits to pre-process the received signal. The sensor interface 402 is controlled in part by a field programmable gate array (FPGA) and/or an ASIC controller circuit 404. An on-board local processor 406 processes the signal to create storable information indicative of the seismic energy sensed at the sensor unit. The information can be in digital form for storage in a storage device 408, also referred to herein as a memory unit. The memory unit can be removable as shown at 408 and/or dedicated 408a with a coupling 410 for providing access to the stored information and/or for transferring the stored information to an external storage unit 411. The coupling 410 might be a cable coupling as shown or the coupling might be an inductive coupling or an optical coupling. Such couplings are known and thus are not described in detail.

The memory 408, 408a can be a nonvolatile memory of sufficient capacity for storing information for later collection or transmission. The memory might be in the form of a memory card, removable miniature hard disk drive, an Electrically-Erasable Programmable Read Only Memory (EEPROM) or the like.

A memory card, also known as a flash memory card or a storage card, is a small storage medium used to store digital information and is suitable for use in seismic prospecting. Flash memory is a type of nonvolatile memory that can be erased and reprogrammed in units of memory called blocks. It is a variation of an EEPROM, which unlike flash memory, is erased and rewritten at the byte level. Thus, updating a flash memory is typically faster than updating an EEPROM.

Interface with the central controller 202 is accomplished with a communication device such as an on-board transmitter-receiver circuit 412, and an antenna 414 selected for the desired transmitting/receiving frequency to provide direct communication with the remotely-located central controller 202. The transmitter/receiver circuit 412 shown is a direct conversion receiver/synthesizer/transmitter circuit and can alternatively be implemented as a software defined radio transceiver. Alternatively, the transmitter/receiver circuit 412 might be any suitable circuit providing transceiver functions such as a transceiver utilizing superheterodyne technology, for example. The antenna 414 can include a VHF/UHF antenna. Other circuitry might include a radio frequency ("RF") front end circuit 416 and a power amplifier 418 for enhancing communication with the central controller 202. These circuits might advantageously be in the form of a removable radio band module 419 to allow operation over a broad frequency band when used with replaceable antennas. A direct conversion radio transceiver provides the advantages of operation over a broad frequency band, allows smaller overall size for the station unit 400, and reduces overall weight for field-transportable units.

Local power is provided by a power supply circuit 420 that includes an on-board rechargeable battery 422. The battery 422 might be of any suitable chemistry and might be nickel-metal hydride (NMH), a lithium-ion or lithium-polymer rechargeable battery of adequate size for the particular application. The battery provides an output to a power supply 424 to condition and regulate power to downstream circuits and the power supply output is coupled to a power control circuit 426 for distributing power to various local components.

The power circuit 420 further includes a charging device 428 and charger interface 430 for coupling the charging device 428 to an external power source 431. A charge indicator 432 provides an indication of amount of charge and/or charging time remaining for the power circuit 420. Such indicators are somewhat common and further description is not necessary here.

Location parameters (e.g., latitude, longitude, azimuth, inclination, etc.) associated with a particular wireless sensor station help to correlate data acquired during a survey. These parameters determined prior to a survey using an expected sensor location and nominal sensor orientation and the parameters can be adjusted according to the present invention. The location parameters are stored in a memory 303, 408 either in the central controller or in the station unit 400. In one embodiment, the wireless sensor station includes a global positioning system ("GPS") receiver 434 and associated antenna 436. The GPS receiver in this embodiment is shown coupled to the processor 406 and to a clock circuit 338 to provide location parameters such as position and location data for correlating seismic information and for synchronizing data acquisition. Alternatively, location parameters can be transmitted to and stored in the central controller and synchronization may be accomplished by sending signals over the VHF/UHF radio link independent of the GPS. Therefore, the on-board GPS can be considered an optional feature of the invention. Location parameters associated with sensor orientation can be determined by accelerometers and/or magnetic sensors and/or manually.

In one embodiment, a wake up circuit 444 allows the wireless station unit to control power consumption from the battery throughout different operating modes. The wake up circuit 444 can be triggered from two sources; the radio receiver 412 or the clock 438. In a low power mode, for example, power is applied only to the radio receiver 412 and the wake up circuit 444. If a specific wake up command is transmitted over the radio and decoded by the wake up circuit, other circuits such as the processor 406 will be enabled and come on-line to support further processing of commands and signals received from the sensor unit. Alternatively the wake up circuit could energize the radio receiver 412 at predetermined time intervals as measured by signals received from the clock 438. At these intervals the radio receiver would be enabled briefly for receiving commands, and if none are received within the enabled time period, the receiver 412 will power down, either autonomously or by command from the wake up circuit.

In one embodiment, the wireless station unit 400 further includes a motion sensor 440 to detect unwanted movement of the station unit or to detect around the station unit, in which a proximity sensor might be used. Such unwanted movement might be caused by wildlife interfering with the unit, soil movement or the like. Furthermore, the movement might be indicative of an attempted theft of the station unit. In the latter event, the wireless station unit might also include an audible alarm 442 to deter theft and to keep animals away from the station unit. Any unwanted movement will be detected by the motion sensor, and a motion sensor output is coupled to the unit by a dedicated interface circuit, or the output can be integrated into the sensor interface.

The motion sensor output is processed using the on-board processor 406 and the processed output is transmitted via the on-board transmitter/receiver circuit 412 to the central controller to alert the operator of the unwanted movement. The GPS receiver output can be processed along with the motion sensor output. This enables tracking of the wireless sensor station unit in the event of theft.

In one embodiment, the function of motion sensing is accomplished with the same sensor unit 208 as is performing the seismic energy sensing function. In the embodiment described above and referring to FIG. 3B having the sensor unit integrated into the wireless station unit, the seismic sensor output will necessarily include components associated with the desired sensed seismic activity as well as sensed components associated with unwanted movement. The output is processed in conjunction with the output signal from the GPS receiver to indicate unwanted station movement. Thus, an output signal transmitted to the central controller 202 might include information relating to unwanted movement as well as seismic information, state of health information or other information relating to a particular wireless station unit 316 and/or sensor unit 320.

Figure 5:
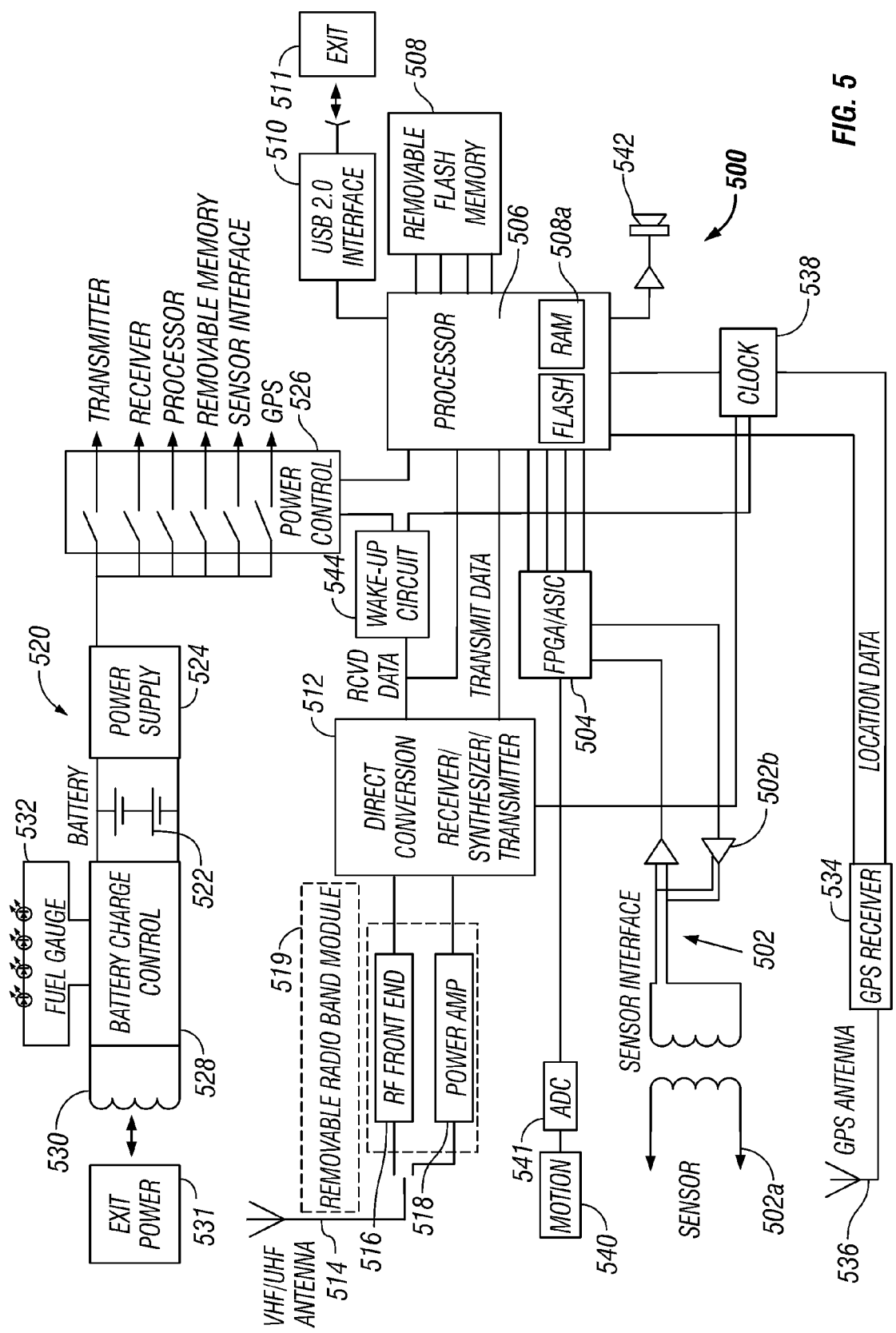
FIG. 5 is a schematic representation of a wireless station unit according to the present invention incorporating circuitry to interface with a digital output sensor unit.

FIG. 5 is a schematic representation of a wireless station unit ("acquisition device") 500 according to the present invention that operates as a data recorder incorporating circuitry to interface with a digital output sensor unit, such as described above and shown in FIG. 3D. A sensor interface 502 according to this embodiment does not require an ADC as in the embodiment described above and shown in FIG. 4, because the signal is already in digital form when received. An ADC, however, might be incorporated for digitizing a motion sensor output from a motion sensor 540. The sensor interface 502 shown includes a protection circuit with an inductive coupling 502a and digital filters 502b to condition the received digital signals and sensor control signals from the FPGA/ASIC control circuit 504.

Although little or no control of the sensor interface 502 is required in this embodiment, the sensor unit is, controlled in part by a field programmable gate array (FPGA) and/or an ASIC controller circuit 504. An on-board local processor 506 processes the signal to create storable information indicative of the seismic energy sensed at the sensor unit. The information might be in digital form for storage in a storage device 508, also referred to herein as a memory unit. The memory unit can be removable as shown at 508 and/or dedicated 508a with a coupling 510 for providing access to the stored information and/or for transferring the stored information to an external storage unit 511. The coupling 510 might be a cable coupling as shown or the coupling might be an inductive coupling or an optical coupling. Such couplings are known and thus are not described in detail.

The memory 508, 508a can be a nonvolatile memory of sufficient capacity for storing information for later collection or transmission. The memory might be in the form of a memory card, removable miniature hard disk drive, an Electrically-Erasable Programmable Read Only Memory (EEPROM) or the like.

Interface with the central controller 202 is accomplished with a communication device such as an on-board transmitter-receiver circuit 512, and an antenna 514 selected for the desired transmitting/receiving frequency to provide direct communication with the remotely-located central controller 202. The transmitter/receiver circuit 512 in one embodiment is a direct conversion receiver/synthesizer/transmitter circuit and can alternatively be implemented as a software defined radio transceiver. Alternatively, the transmitter/receiver circuit 512 might be any suitable circuit providing transceiver functions such as a transceiver utilizing superheterodyne technology, for example. The antenna 514 can be a VHF/UHF antenna. Other circuitry might include a radio frequency ("RF") front end circuit 516 and a power amplifier 518 for enhancing communication with the central controller 202. These circuits might advantageously be in the form of a removable radio band module 519 to allow operation over a broad frequency band when used with replaceable antennas. A direct conversion radio transceiver provides the advantages of operation over a broad frequency band, allows smaller overall size for the station unit 500, and reduces overall weight for field-transportable units.

Local power can be provided by a power supply circuit 520 that includes an on-board rechargeable battery 522. The battery 522 might be of any suitable chemistry, e.g., nickel-metal hydride (NMH), a lithium-ion or lithium-polymer rechargeable battery of adequate size for the particular application. The battery provides an output to a power supply 524 to condition and regulate power to down-stream circuits and the power supply output is coupled to a power control circuit 526 for distributing power to various local components.

The power circuit 520 further includes a charging device 528 and charger interface 530 for coupling the charging device 528 to an external power 531. A charge indicator 532 provides an indication of amount of charge and/or charging time remaining for the power circuit 520. Such indicators are somewhat common and further description is not necessary here.

Location parameters (e.g., latitude, longitude, azimuth, inclination, etc.) associated with a particular wireless sensor station help to correlate data acquired during a survey. These parameters determined prior to a survey using an expected sensor location and nominal sensor orientation and the parameters can be adjusted according to the present invention. The location parameters are stored in a memory 303, 508 either in the central controller or in the station unit 500. In one embodiment, the wireless sensor station includes a global positioning system ("GPS") receiver 534 and associated antenna 536. The GPS receiver in this embodiment is coupled to the processor 506 and to a clock circuit 538 to provide location parameters such as position and location data for correlating seismic information and for synchronizing data acquisition. Alternatively, location parameters can be transmitted to and stored in the central controller and synchronization may be accomplished by sending signals over the VHF/UHF radio link independent of the GPS. Therefore, the on-board GPS can be considered an optional feature of the invention. Location parameters associated with sensor orientation can be determined by accelerometers and/or magnetic sensors and/or manually.

In one embodiment, a wake up circuit 544 allows the wireless station unit to control power consumption from the battery throughout different operating modes. The wake up circuit 544 can be triggered from two sources; the radio receiver 512 or the clock 538. In a low power mode, for example, power is applied only to the radio receiver 512 and the wake up circuit 544. If a specific wake up command is transmitted over the radio and decoded by the wake up circuit, other circuits such as the processor 506 will be enabled and come on-line to support further processing of commands and signals received from the sensor unit. Alternatively the wake up circuit could energize the radio receiver 512 at predetermined time intervals as measured by signals received from the clock 538. At these intervals the radio receiver would be enabled briefly for receiving commands, and if none are received within the enabled time period, the receiver 512 will power down, either autonomously or by command from the wake up circuit.

In one embodiment, the wireless station unit 500 further includes a motion sensor 540 to detect unwanted movement of the station unit or to detect around the station unit, in which a proximity sensor might be used. Such unwanted movement might be caused by wildlife interfering with the unit, soil movement or the like. Furthermore, the movement might be indicative of an attempted theft of the station unit. In the latter event, the wireless station unit might also include an audible alarm 542 to deter theft and to keep animals away from the station unit. Any unwanted movement will be detected by the motion sensor, and a motion sensor output is coupled to the unit by a dedicated interface circuit, or the output can be integrated into the sensor interface.

The motion sensor output can be digitized using an ADC 541 and the digitized output is processed using the on-board processor 506 and the processed output is transmitted via the on-board transmitter/receiver circuit 512 to the central controller to alert the operator of the unwanted movement. The GPS receiver output can be processed along with the motion sensor output. This enables tracking of the wireless sensor station unit in the event of theft.

In one embodiment, the function of motion sensing is accomplished with the same sensor unit 208 as is performing the seismic energy sensing function. In the embodiment described above and referring to FIG. 3B having the sensor unit integrated into the wireless station unit, the seismic sensor output will necessarily include components associated with the desired sensed seismic activity as well as sensed components associated with unwanted movement. The output is processed in conjunction with the output signal from the GPS receiver to indicate unwanted station movement. Thus, an output signal transmitted to the central controller 202 might include information relating to unwanted movement as well as seismic information, state of health information or other information relating to a particular wireless station unit 316 and/or sensor unit 320.

Figure 6A:
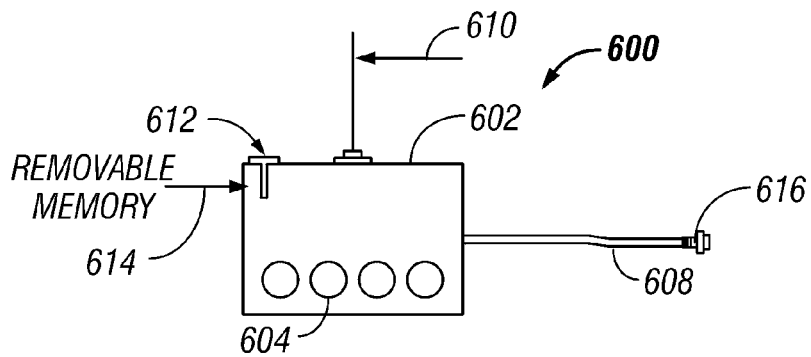
FIGS. 6A-6C show several alternative embodiments of a wireless station unit according to the present invention.
Figure 6B:
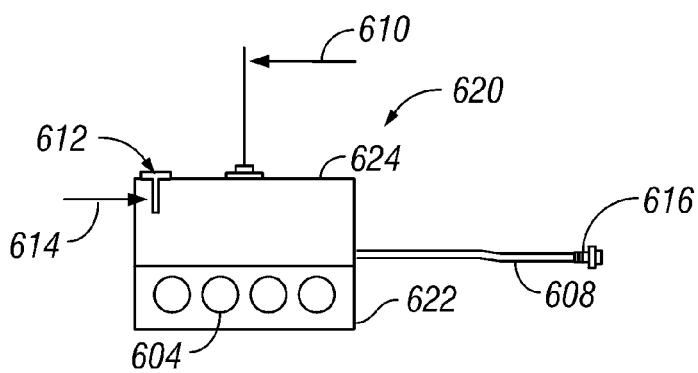
Figure 6C:
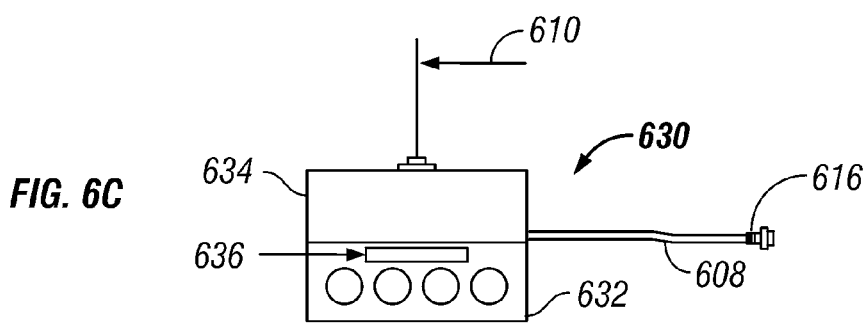

FIGS. 6A-6C show several alternative embodiments of a wireless station unit according to the present invention. FIG. 6A shows a wireless station unit 600 having a closed housing 602 and integral rechargeable battery 604. A short cable 608 is shown with a sensor connector 616 for interface with a sensor unit. An antenna 610 is coupled to the housing 602. A memory access door 612 is provided to allow access to information stored on local memory 614. The memory device 614 in one embodiment is removable via the memory access door 612.

FIG. 6B shows an embodiment of a wireless station unit 620 that is substantially similar to the embodiment shown in FIG. 6A. The battery pack 622, however is removable with respect to a housing 624. An advantage here is that a fully charged battery pack can be transported to the wireless station unit 620 to replace a discharged battery pack without moving the wireless station unit from the deployed location for charging.

FIG. 6C shows an alternate of a wireless station unit 630 that is substantially similar to the embodiments shown in FIGS. 6A-B. A battery pack 632 in this embodiment, however is removable with respect to a housing 634 and further includes a memory card 636. An advantage of this embodiment is that the memory card 636 with seismic information stored thereon can be replaced with a fresh (empty) memory card simultaneously with battery replacement. It should be understood that any embodiment described according to FIGS. 6A-6C can be easily altered to provide an integral seismic sensor to eliminate the cable 608.

Figure 7:
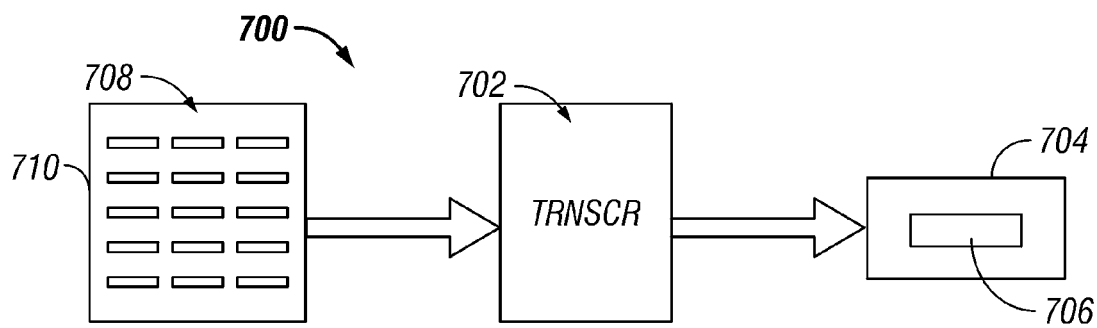
FIG. 7 shows one method of transferring information stored on a memory card after data acquisition.

FIG. 7 shows one method of transferring information stored on a memory card after data acquisition. An information transfer system 700 includes a transcriber, coupled to a tape drive 704. The tape drive 704 shown holds a magnetic tape 706, but any suitable storage medium would suffice for the purposes of the present invention.

Once data are written to a memory card 708 in the wireless station units the information must be collected and transcribed onto a common repository for all stations in the survey. This process is accomplished by collecting the removable memory cards or memory card/battery packs depending on the embodiment of the wireless station unit used and transporting the memory card(s) 708 to the transcriber system 700. The memory cards are placed in a memory card reader 710 or in a memory card reader plus a battery charger when using an embodiment according to FIG. 6C. The transcriber 702 reads the data from the memory cards 708 and compiles the data into individual shot records. The transcriber 702 also performs data processing and writes the combined processed data into electronic files. These files are then transferred to permanent storage media such as the magnetic tape 706 in the tape drive 704.

Alternatively, a transcriber system 700 can be transported to each sensor location rather than having the cards collected as described above. The reader 710 can be of any suitable type for on-site transfer and can be coupled to a station unit via cable, optical or inductive coupling.

In one embodiment, a computer with monitor and printer can be used with the transcriber 702 to display the data on the computer monitor for review and inspection or for plotting the data on paper records.

In several alternative embodiments, methods of the present invention are used to sense, record and transfer information from a seismic sensor location to a central recorder. In one embodiment, a wireless station unit substantially as described above and shown in FIG. 4. Each wireless sensor station is transported to a predetermined spread location. Upon arriving at the location, viability of the location is determined in real time based on the terrain, obstacles borders etc. . . . The location is adjusted where necessary and feasible. If adjusted, location parameters (e.g., latitude, longitude, azimuth, inclination, etc.) associated with the particular wireless sensor station so adjusted are determined and entered as updated system parameters. In one embodiment, these parameters are determined using a GPS receiver to determine the actual location of the planted sensor unit. Other parameters might be determined with a manual compass used by the crew or by one or more magnetometers in the sensor unit. Parameters might also be determined using multi-component accelerometers for determining orientation of the planted sensor unit. In one embodiment the updated system parameters are entered by the field crew in the wireless sensor station unit itself. In one embodiment, the updated system parameters are entered at the central controller. In another embodiment, the updated system parameters are entered automatically upon system activation and sensor station wake-up using location parameters and orientation parameters determined by a GPS receiver, accelerometers, magnetometers, and/or other sensors disposed in the station or sensor unit or both.

Referring to FIGS. 2-7, a system 200 according to the present invention includes a central controller 202 remotely located from a plurality of station units 208. Each station unit 208 includes a sensor unit 320 remotely located from the central controller 202. Each sensor unit 320 is coupled to the earth for sensing seismic energy in the earth, which might be natural seismic energy or energy produced from a seismic source 206. The sensor unit 320 provides a signal indicative of the sensed seismic energy and a recorder device 316 co-located with the sensor unit receives the signal stores information indicative of the received signal in a memory unit 408 disposed in the recorder device 316. A communication device 412 is co-located with the sensor unit and the recorder device for providing direct two-way wireless communication with the central controller.

While the particular invention as herein shown and disclosed in detail is fully capable of obtaining the objects and providing the advantages hereinbefore stated, it is to be understood that this disclosure is merely illustrative of the presently described embodiments of the invention and that no limitations are intended other than as described in the appended claims.

What is claimed is:

1. An apparatus for acquiring seismic data used in characterizing a subsurface formation, comprising:
    a) a sensor unit configured to be coupled to the earth's surface to sense seismic energy, the sensor unit configured to sense seismic energy imparted into the subsurface formation and to provide a signal indicative of seismic energy reflected from the subsurface formation and suitable for imaging the subsurface formation;
    b) an acquisition device co-located with the sensor unit and coupled thereto, the acquisition device being configured to receive the signal;
    c) a memory unit disposed in the acquisition device, the memory unit being configured to receive a location parameter when the acquisition device enters a wake state; and
    d) a communication device configured to provide direct wireless bi-directional communication between the acquisition device and a remotely-located central controller.

2. An apparatus according to claim 1, wherein the acquisition device is in a housing and the sensor unit is separate from the housing, and further comprising an orientation sensor configured to determine an orientation of the sensor unit, the sensor being positioned in the sensor unit.

3. An apparatus according to claim 1, wherein the sensor unit and the acquisition device are coupled together with a cable.

4. An apparatus according to claim 1, wherein the sensor unit includes one of a velocity sensor and a pressure sensor.

5. An apparatus according to claim 1, wherein the sensor unit includes an accelerometer.

6. An apparatus according to claim 1, wherein the sensor unit further comprises a multi-component sensor.

7. An apparatus according to claim 1 further comprising a processor in the acquisition unit configured to provide one or more of local control, time keeping, and power management.

8. An apparatus according to claim 1 further comprising a removable power source disposed in the acquisition device configured to provide electrical power to one or more of the acquisition device, the sensor unit and the communication device.

9. An apparatus according to claim 1 wherein the sensor unit is a single sensor unit.

10. A system for seismic surveying to characterize a subsurface formation, comprising:
    a) a central controller;
    b) an array configured to acquire seismic data relating to a subsurface formation and configured to be controlled by the central controller; the array including at least one acquisition device comprising:
        (i) a sensor unit remotely located from the central controller, the sensor unit coupled to the earth configured to sense seismic energy in the earth and to provide a signal indicative of the seismic energy reflected from the subsurface formation;
        (ii) a recorder co-located with the sensor unit and coupled thereto and configured to receive the signal and to store in digital form information indicative of the received signal in a memory disposed in the recorder device, the memory being further configured to store a location parameter when the recorder enters a wake state; and
        (iii) a communication device co-located with the sensor unit and the recorder device configured to provide direct wireless bi-directional communication with the central controller; and
    c) a seismic energy source configured to provide seismic energy of a known magnitude and source location.

11. The system according to claim 10, wherein the communication device includes a two-way wireless transceiver configured to provide wireless communication with the central controller.

12. The system according to claim 10, further comprising an information transfer system configured to operatively couple with the memory of each recorder device, the information transfer system being configured to read data from each memory and compile shot records.

13. The system according to claim 10, wherein the memory of each recorder device is configured to receive a location parameter entered by a field crew and wherein the communication device is configured to transmit the entered location parameter to the central controller.

14. The system according to claim 10 wherein the central controller is configured to receive a system parameter relating to the sensor unit, the system parameter being an adjusted location parameter.

15. The system according to claim 14 wherein the adjusted location parameter is relative to a predetermined location spread.

16. A system for seismic surveying to characterize a subsurface formation, comprising:
    an array configured to acquire seismic data relating to a subsurface formation, the array including:
    a plurality of acquisition devices, each acquisition device comprising:
        (i) a sensor, configured to be planted in the earth, to sense seismic energy in the earth and to provide a signal indicative of the seismic energy reflected from the subsurface formation,
        (ii) a recorder co-located with the sensor and configured to receive the signal and to store in digital form information indicative of the received signal in a memory disposed in the recorder, the memory being further configured to store a location parameter when the recorder enters a wake state, and
        (iii) a communication device co-located with the sensor unit and the recorder configured to provide direct wireless bi-directional communication;
    a central controller configured to receive the information indicative of the location parameter; and
    a seismic energy source configured to provide seismic energy of a known magnitude and source location.

17. The system of claim 16 further comprising:
    an orientation sensor configured to determine a sensor orientation, the orientation sensor being configured to be used by a field crew, wherein the orientation sensor is one of (i) a compass, and (ii) a magnetometer, and wherein the recorder is configured to receive an orientation parameter from the orientation sensor.

18. The system of claim 16 wherein the sensor includes a multi component accelerometer configured to determine a sensor orientation.

19. The system of claim 16 wherein each acquisition device is configured to have a low power mode wherein power is applied to the communication device, and further comprising a wake-up circuit, wherein the wake-up circuit is configured to enable at least one other circuit upon receiving a wake up command.

20. The system of claim 16 further comprising:
a first orientation sensor configured to be carried by a field crew, the processor being configured to receive a first sensor orientation parameter determined by the first orientation sensor, the first sensor orientation parameter being entered into the processor by the field crew; and
a second orientation sensor in each acquisition device, the second orientation sensor being configured to determine a second sensor orientation parameter.

21. An apparatus according to claim 1, further comprising a GPS unit co-located with the sensor unit.

* * * * *